Sept. 25, 1956  C. G. YATES, JR  2,764,370
AIRCRAFT CONTROL EQUIPMENT
Filed Aug. 4, 1951  3 Sheets-Sheet 1

Inventor:
Charles G. Yates, Jr.
by *Charles N. Mott*
His Attorney.

Sept. 25, 1956      C. G. YATES, JR      2,764,370
AIRCRAFT CONTROL EQUIPMENT Filed Aug. 4, 1951      3 Sheets-Sheet 2

Inventor:
Charles G. Yates, Jr.
by Charles N. Matt
His Attorney.

United States Patent Office 2,764,370
Patented Sept. 25, 1956

2,764,370

AIRCRAFT CONTROL EQUIPMENT

Charles G. Yates, Jr., Schenectady, N. Y., assignor to General Electric Company, a corporation of New York Application August 4, 1951, Serial No. 240,384

13 Claims. (Cl. 244—77)

This invention relates to automatic control equipment for aircraft, and more particularly to equipment for damping undesired transient changes in attitude of an aircraft about the various coordinate control axes of flight.

Because of their aerodynamic design many of the latest type high speed aircraft are extremely susceptible to oscillatory motion around their control axes, the various designs being used despite this oscillation susceptibility since in other respects they are the most advantageous for obtaining high speed flight. These oscillatory motions are particularly undesirable in military aircraft, for the oscillations if allowed to persist make the aircraft a very poor gunnery platform; and if the human pilot attempts to take out the oscillation by his manual controls, the result is usually an increased oscillation. It is, of course, possible to remove the oscillations by changing the aerodynamic structure of the aircraft, but such a change not only results in an increased air drag but also increases the weight of the average aircraft by several hundred pounds.

Thus, the usual manner of damping these oscillations has been to use automatic systems for moving the various control surfaces of the aircraft in response to any tendency of the aircraft to oscillate about its related control axes. Conventionally, these systems each include a device, such as a spring-loaded gyro, for sensing the rate of movement of the aircraft about the associated control axis, and means responsive to the gyro output signal for actuating a servo device which drives the control surface in a direction to oppose the movement, the control surface displacement being proportional to the rate of craft movement. As is well known in the art, a servo follow-up signal is ordinarily included in the system in opposition to the output of the sensing device in order to prevent hunting of the control surface. Such damping systems, as such, do not maintain any particular fixed or controllable direction of flight in the manner of an autopilot, but merely function during a change of attitude to oppose the change.

However, these conventional oscillation damping systems are not entirely satisfactory, for they oppose maneuvering of the aircraft by the human or automatic pilot. Since the systems are designed to prevent oscillatory turning about the control axes, they also try to prevent any steady turning around the axes, even though the steady turning is desired by the pilot. For example, during a turn which is, in a sense, a steady unidirectional yawing of the aircraft, conventional yaw damping systems, as actuated by a rate-of-turn sensing device, continuously attempt to return the aircraft to straight flight, so that the human pilot must supply an increased force to the rudder pedals over that which would otherwise be necessary to make the turn. This makes quite difficult the attainment of a co-ordinated or "ball-center" turn and thus increases skidding or sideslipping of the aircraft during a turn. By a "ball-center" turn I mean one in which the actual vertical axis of the aircraft coincides with the apparent vertical axis, i. e. with the resultant of the gravitational and centrifugal acceleration forces on the aircraft. The continuous turn opposing action of such yaw damping systems is particularly objectionable in military aircraft, where the lives of both the plane and the pilot may depend upon the maneuverability attainable.

A further disadvantage of such known oscillation damping systems is that they do not constitute part of the autopilot control system when placed in aircraft possessing such systems. In other words, the various components of the oscillation damping systems are not integrated in the autopilot system, even though a common rate sensing device may be used in both systems. The various oscillation damping systems thus add considerable weight to the plane; for example, a conventional yaw damping system usually adds at least 30 pounds to the aircraft weight. Since a primary aim in aircraft design is to keep the aircraft weight as low as possible, the added weight from the conventional oscillation damping systems is thus wholly undesirable.

It is accordingly an important object of my invention to provide a new and improved automatic system for damping oscillations of an aircraft about the various control axes thereof.

It is another object of this invention to provide a new and improved oscillation damping system which does not oppose maneuvering of the aircraft.

It is another object of this invention to provide a new and improved oscillation damping system forming an integral part of an automatic pilot system in aircraft possessing such systems, but operable separately with good results in aircraft not provided with an automatic pilot system.

It is a further object to provide a new and improved combined oscillation damping and turn control system which aids the pilot in making co-ordinated turns.

It is still a further object to provide a rudder control system which may be used as one channel of an autopilot or may be used independently for rudder control in an aircraft in which the other control surfaces are manually controlled.

In carrying out my invention in one form thereof I provide for any control surface of an aircraft an oscillation damping system employing rate-responsive means, such as a spring-loaded gyroscope, to sense the rate of movement of the aircraft about the associated control axis. The rate-responsive means electrically actuates a servo device to change the position of the control surface, whereby oscillation damping is accomplished. A servo follow-up or repeat-back device is incluced in the system to prevent hunting of the control surface, and in addition a time element canceller device is included in the system to automatically cancel or otherwise nullify the output of the rate-responsive device upon a desired steady turning of the aircraft about the associated axis. The cancelling of the steady-state rate signal produced during such a steady turning prevents the system from opposing directed turning and thus facilitates maneuverability of the aircraft without opposition from the damping or stabilizing apparatus.

In the combination oscillation damping and turn control system embodying my invention in another form, I provide, in addition to the above-mentioned devices, additional signal means responsive to the deviation of the aircraft from a desired angle relative to another coordinate control axis; and I connect the canceller device to cancel or otherwise nullify the signals from both the follow-up device and the rate-responsive device. Thus, if, for example, the system is used for rudder control, during a steady turning of the aircraft only the signals from the additional signal means, such as an acceleration-responsive device are applied to the rudder servo. This results in a system which, in addition to providing yaw damping, also provides for automatic coordinated turning of the aircraft about the vertical control axis. I further contemplate that either of the foregoing arrangements may be incorporated as an integral part of an autopilot control.

The features of this invention which are believed to be novel and patentable are pointed out with particularity in the appended claims. The invention itself, however, both as to organization and mode of operation together with additional objects and advantages thereof, may be best understood by reference to the following description to be taken in conjunction with the accompanying drawing in which:

Figure 1:
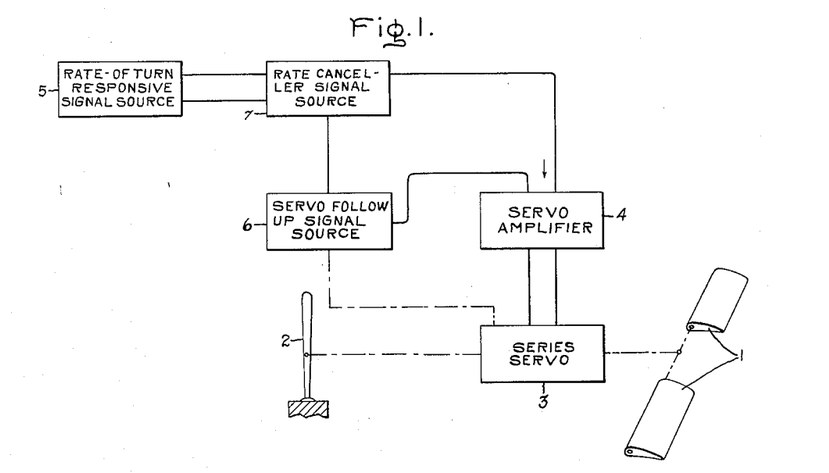
Fig. 1 is a simplified schematic diagram in block form of an oscillation damping system embodying my invention in one form.
Figure 3A:
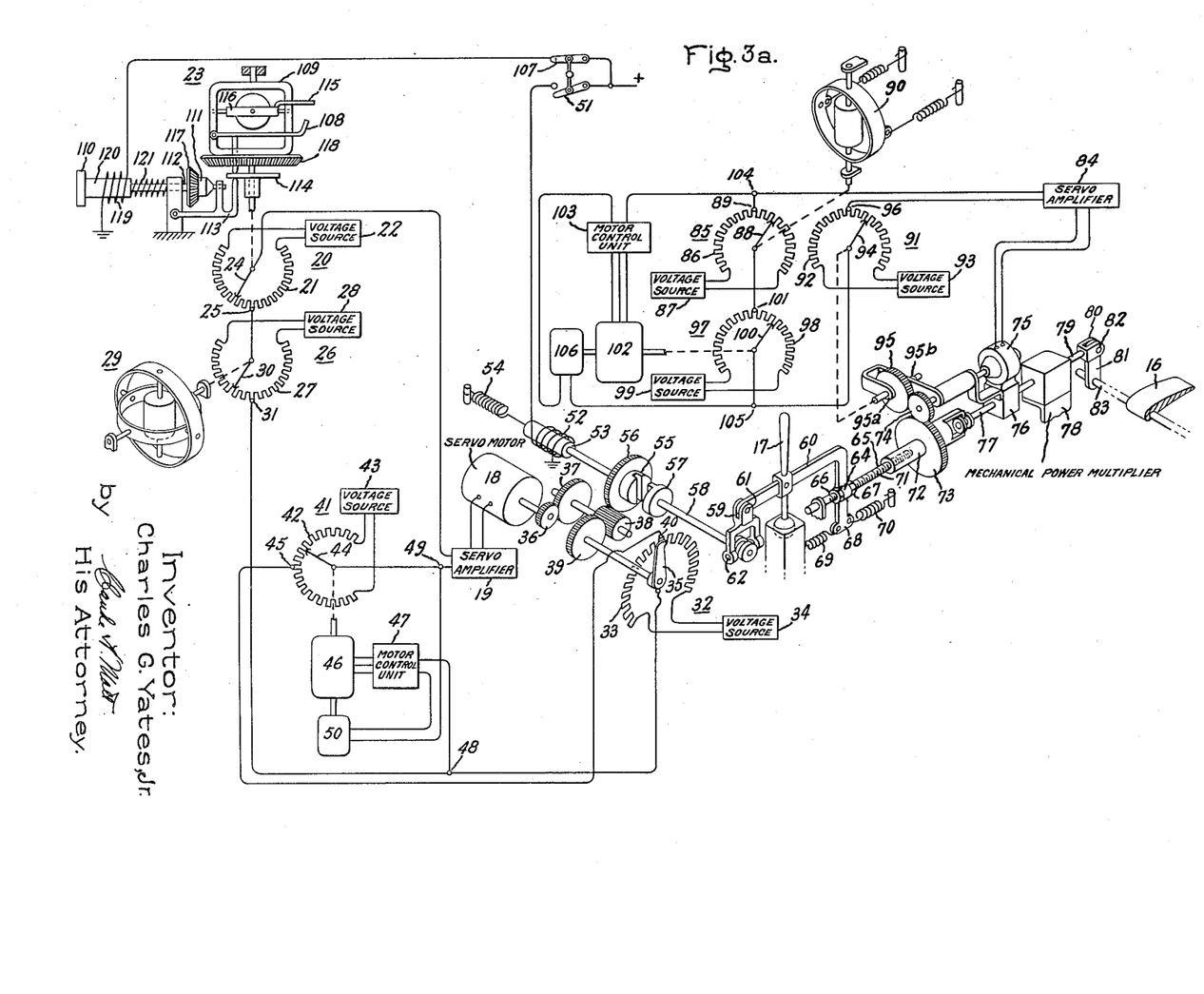
Fig. 3a is a diagrammatic representation of an autopilot aileron control system including the oscillation damping system of Fig. 1.

Referring to Fig. 1, therein is shown an oscillation damping system i. e. a dynamic stability aid, embodying my invention in one form. In the diagram an aircraft control surface, such as a pair of ailerons 1, is manually controlled from a "joy" stick 2 and intermediate in the mechanical linkage joining the stick 2 and the ailerons 1 is connected a "series servo" mechanism 3, such as is well known in the art and will be more fully described in connection with Fig. 3. Servo mechanism 3 moves ailerons 1 in opposite directions in response to the signals fed to it from a servo amplifier 4, but in so doing does not cause any movement of "joy" stick 2. In other words, any force fed into the linkage by series servo 3 is reflected in a movement of ailerons 1 but not in a movement of stick 2. The servo mechanism 3 of course also transmits manual movements of the stick 2 to the ailerons. The "series servo" mechanism; as will hereinafter appear, is such that manual actuation of the connected control surface produces no follow-up signal. Wherever the term "series servo" is hereinafter used, a device having the foregoing characteristics is intended to be identified.

The servo amplifier 4 is supplied with signals responsive to transient deviation of the craft about its bank axis, and through the servo 3 such signals control the ailerons to stabilize the aircraft about such axis. The input circuit for servo amplifier 4 contains a signal source 5 which is responsive to the rate of turn of the aircraft about the bank axis, an example of a device which could be used to control a variable voltage source for producing such a signal being a spring-mounted bank rate gyro such as shown in Patent 2,464,629—Young. Serially connected with the rate-of-bank responsive signal source 5 in the input circuit for servo amplifier 4 is a servo follow-up or repeat-back signal source 6 which produces a signal proportional to the displacement of the ailerons from a predetermined neutral position. The follow-up source 6 is connected in opposition to the rate-responsive source 5, so that the signal fed to amplifier 4 is actually the difference of the signals from sources 5 and 6. The follow-up 6 is included in the circuit to prevent hunting of the ailerons, as would occur if servo 3 were supplied only with signals from rate-of-bank source 5.

Source 5, being responsive to any roll of the aircraft about its bank axis, feeds a signal to servo amplifier 4 to move ailerons 1 so as to oppose such roll. Any oscillatory roll is similarly opposed. In conjunction with the anti-hunt action of follow-up source 6 the rate-responsive source 5 thus substantially eliminates oscillations of the aircraft about the bank axis.

The only signals necessary to damp such oscillatory motion are transient signals, since the craft attitude is constantly and rather rapidly changing. However, if the aircraft is turned at a steady rate about the bank axis by the pilot, the rate of bank signal source 5 produces a steady-state or substantially steady-state signal which if applied to servo 3 would oppose the action desired by the pilot, and thereby detract from the maneuverability of the aircraft.

Thus, according to my invention, there is connected in the system a rate canceller signal source 7 which is controlled by the signals from rate-responsive signal source 5. Rate canceller 7, which may be any known time-element canceller devices such as the preferred one of which is more fully discussed hereinafter, produces an output signal in response to any steady-state or substantially steady-state, i. e. non-transient, signal from source 5, but does not produce any output signal in response to non-steady-state, i. e. transient, signals from source 5. The output signal produced by rate canceller 7 in response to a steady-state rate signal is substantially equal and opposite to that signal, and the canceller output is connected in the system in series circuit relation so that this output signal opposes the rate signal. In other words, when source 5 is producing a steady-state or substantially steady-state signal, source 7 produces an equal and opposite nullifying signal causing the servo 3 to be controlled by the servo follow-up signal source 6 alone. Since the output of source 6 is proportional to the displacement of servo 3, this results in the servo being returned to its neutral position.

The action of rate canceller 7 thus eliminates any tendency of the system to oppose maneuvering of the aircraft by the pilot. Moreover, since it is not responsive to transient signals from source 5, the rate canceller does not detract from the oscillation damping action of the system. In addition to accomplishing oscillation damping during level flight, this system also operates to produce damping during a steady banking of the aircraft, since the canceller then nullifies the base steady-state signal but allows any transient signal superimposed on the base signal to reach the servo. More specifically, if the aircraft should tend to oscillate during a steady turning about the associated control axis, the rate-responsive source produces transient signals which are not cancelled and therefore actuate the series servo to damp out the oscillations. Thus, this damping system in which a canceller signal source is used to cancel any steady-state signals from the rate-of-turn responsive source produces a greatly improved action over conventional damping systems in that it accomplishes oscillation damping without opposing the maneuvering of the aircraft by the pilot.

Figure 2:
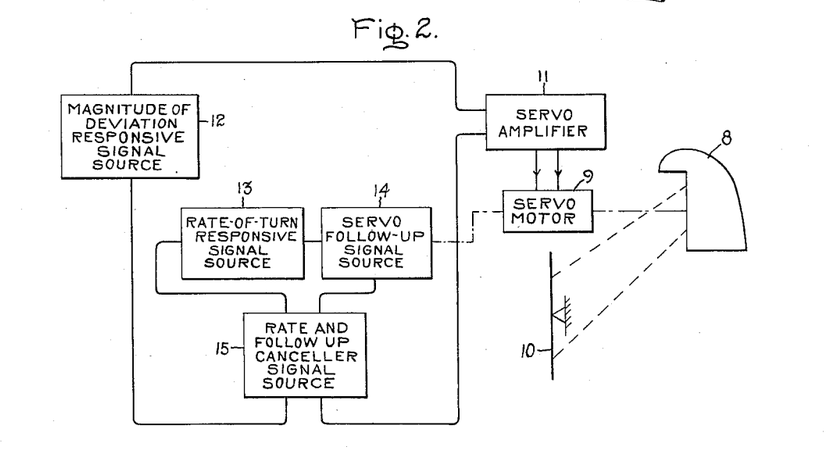
Fig. 2 is a simplified schematic diagram in block form of an oscillation damping and turn control system illustrating another embodiment of my invention.

Referring now to Fig. 2, I have shown therein a combination oscillation damping and turn control system embodying my invention and applied to control the movement of a control surface, such as a rudder 8. In addition to the automatic control of rudder 8 supplied from motor means, such as the servomotor 9, there are also provided manual control means in the form of rudder pedals 10. The action of the illustrated control system is such, however, that the pilot need use the rudder pedals only when he desires to skid or slideslip the aircraft, or if, for some other reason, he desires to remove the aircraft from automatic control. As previously mentioned, the new and improved automatic movement of the rudder is accomplished by means of a servomotor 9, which is energized from a servo amplifier 11 connected to be actuated from a circuit including in series circuit relation a signal source 12 responsive to deviation of the aircraft from a desired angle relative to the vertical control axis, a rate-of-turn responsive signal source 13, and a servo follow-up source 14, follow-up source 14 being connected in opposition to source 12 and 13 so as to prevent hunting of rudder 8. The magnitude of deviation responsive source 12 may be controlled by various devices including acceleration responsive means, such as a pendulum, while the rate responsive source 13 may be controlled by any rate-of-turn responsive device, for example, a spring-loaded yaw rate gyro.

Besides sources 12, 13, and 14 the servo actuating circuit also includes, in accordance with this invention, a time element responsive rate and follow-up canceller signal source 15 which is connected in series opposition to rate-of-turn responsive source 13 and follow-up source 14. Canceller 15, which may be similar to the canceller 7 of Fig. 1 and will be more fully described hereinafter, is controlled by the sum of the signals from sources 13 and 14 and operates to produce a signal substantially equal and opposite to any steady-state or substantially steady-state, i. e. non-transient, of such signals. The canceller does not, however, produce any output signal in response to non-steady-state, i. e. transient, resultant signals from the sources 13 and 14.

Whenever the aircraft tends to oscillate about the control axis associated with source 13, here the vertical or turn axis, source 13 produces signals proportional to the rate of turn of the aircraft about the axis, and these signals are fed through amplifier 11 to motor 9 to move rudder 8 so as to damp out these oscillations. Servo follow-up 14, of course, produces signals in opposition to these actuating signals dependent upon the movement of rudder 8 in order to prevent hunting of the rudder. Since these are transient signals, canceller source 15 does not oppose this damping action of the circuit.

Of course, if the pilot should place the aircraft in a turn, in a manner which is explained hereinafter, the rate-of-turn responsive signal source 13 thereupon produces a steady-state signal tending to oppose the turn. However, the rate and follow-up canceller signal source 15 produces a signal cancelling this steady-state output of source 13, and thus, there is no signal fed to servomotor 9 to oppose the turning of the aircraft. Moreover, any oscillations tending to occur during the steady turn are automatically damped by the system, since the canceller passes the resultant transient signals while nullifying the base steady-state signal. This system thus accomplishes oscillation damping either during straight flight of the aircraft or during a turn of the aircraft without hindering the maneuverability of the aircraft.

In addition to oscillation damping, this system, if employed for rudder control, also produces coordinated turning of the aircraft whenever it is banked about its longitudinal axis. When the pilot banks the aircraft about its longitudinal axis by means of the ailerons, the true vertical axis of the aircraft no longer corresponds with the apparent vertical axis and the magnitude of deviation responsive source 12 thereupon produces a signal. This signal is, of course, fed to motor 9 and moves rudder 8 so as to place the aircraft in a turn. More specifically, the rudder is moved until a coordinated turn is obtained whereupon source 12 is returned to its neutral or no signal position. For example, if acceleration responsive means are used to control source 12, centrifugal acceleration returns source 12 to the no signal position.

Once the aircraft is in the coordinated turn, follow-up source 14 may actually move rudder 8 back to its null position if, as is often the case, a continued displacement of the rudder is not necessary to continue the turn. However, if a continued displacement of the rudder is necessary so that the signal from follow-up source 14 tends to remain steady for a time, canceller 15 will operate to cancel the signal. This is necessary since otherwise the follow-up signal would cause the aircraft to deviate from the path of the coordinated turn because of a lack of signal from source 12 when the plane is actually in the coordinated turn. The action of source 12 and canceller 15 is thus to keep the aircraft in a coordinated turn until such a time as the pilot returns the plane to level flight by means of the ailerons. Then if the plane continues to turn the magnitude of deviation responsive source 12 produces a signal opposite to the original turn producing signal causing the rudder to move in a reverse direction to stop the turning motion. Thus, this system in addition to damping oscillations of the aircraft without detracting from the maneuverability thereof also operates to produce coordinated turning of the aircraft in response to the banking thereof.

It has been assumed hereinbefore that the systems illustrated in Figs. 1 and 2 were being used in manually controlled aircraft, which, of course, might be quite advantageously done, but an important feature of this invention is that these systems may be combined with an autopilot system to produce new and improved results. Thus, in Fig. 3a the new and improved oscillation damping system illustrated in Fig. 1 is shown as applied in the aileron control system of an aircraft having both an autopilot and a manual control. In addition I have shown at Fig. 3b a rudder channel control for use in conjunction with the aileron control of Fig. 3a and including the oscillation damping and turn control system of Fig. 2. The operating interrelation of the aileron channel control of Fig. 3a and the rudder channel control of Fig. 3b will be more fully explained hereinafter.

Referring to Fig. 3a, the ailerons 16 of an aircraft may be controlled either manually by means of a conventional "joy" stick 17, or may be automatically controlled from a servomotor 18 actuated from an automatic pilot system. The control signals energizing motor 18 are applied from a servo amplifier 19 which is itself actuated from an aileron control channel in which are included in series circuit relation a plurality of signal sources. The first of these signal sources 20 comprises a potentiometer 21 connected across a voltage source 22 and is controlled by a directional gyroscope 23 which is mounted in a pair of gimbal rings for two degrees of freedom. The potentiometer wiper arm 24 is connected for rotation with the vertical gimbal ring of gyro 23 and signals indicating the azimuth deviation of the aircraft from the desired heading are derived from between arm 24 and a fixed tap point 25 in the potentiometer.

A second signal source 26 comprising a potentiometer 27 connected across a voltage source 28 is controlled by a vertical gyroscope 29 which is likewise mounted in a pair of gimbal rings for two degrees of freedom. The potentiometer wiper arm 30 is movable along both sides of a fixed tap 31 and is coupled for movement with the horizontal gimbal of gyro 29, the axis of the horizontal gimbal being parallel to the longitudinal axis of the aircraft. The output of source 26 is taken between wiper arm 30 and tap 31 and is indicative of the magnitude of displacement of the aircraft around its longitudinal or bank axis relative to the level flight position.

Also connected in the servo circuit is a follow-up or repeat-back signal source 32 which includes a potentiometer 33 connected across a voltage source 34. The potentiometer wiper arm 35 is mechanically actuated by the servomotor 18 through a gearing system including a plurality of gears 36, 37, 38, and 39 so that its movements correspond to those of motor 18; and the follow-up signal output appearing between wiper arm 35 and a fixed tap 40 on the potentiometer 33 is variable in magnitude and polarity dependent upon the extent and direction of movement of wiper arm 35 from coincidence with tap 40.

As is well known in the art, follow-up source 32 is connected in the servo circuit in opposition to sources 20 and 26 so as to prevent hunting of motor 18. In other words, as motor 18 is displaced from its null position in response to a signal from sources 20 or 26, source 32 produces a signal tending to return the motor to a zero position.

Besides signal sources 20, 26, and 32 the servo circuit also includes in series circuit relation a follow-up canceller signal source 41 which operates, as is more fully explained hereinafter, to substantially cancel any steady-state, i. e. non-transient, signals from source 32. Canceller signal source 41 itself comprises a potentiometer 42 which is connected across a voltage source 43 and has a wiper arm 44 movable in either direction from a fixed tap 45, the output signal of the source being taken between arm 44 and tap 45 and thus being dependent in polarity and magnitude upon the direction and magnitude of the displacement of arm 44 from tap 45. The position of arm 44 is determined by the position of a motor 46 which is energized from a motor control unit 47 to rotate in either direction dependent upon the polarity of the signal supplied to control unit 47 and at a rate dependent upon the magnitude of the signals applied to unit 47. As shown in the diagram, control unit 47 is controlled by the signals appearing across points 48 and 49, which signals are the algebraic summation of the outputs of sources 32 and 41 or, in other words, are the combined outputs of sources 32 and 41. The impedance of amplifier 19 is so much greater than the impedance of the various signal sources that signals from sources 20 and 26 do not appear to any appreciable extent across points 48 and 49. More specifically, although amplifier 19 and control unit 47 are connected in series across sources 20 and 26, sources 32 and 41 form such a low impedance parallel path around control unit 47 that any signal from sources 20 and 26 is dissipated almost entirely across amplifier 19.

In order to make control unit 47 and thus canceller source 41 responsive to non-transient signals only, a special generator 50 is included in the input circuit to control unit 47 in the manner described in the copending applications of Charles M. Young, for "Airplane Maneuvering System," Serial No. 39,346, now Patent #2,582,305, issued Jan. 15, 1952, and for "Autopilot Control System," Serial No. 39,347, now Patent #2,664,530, issued Dec. 29, 1953, both filed July 17, 1948, and assigned to the same assignee as the present invention. Generator 50 is placed in series with the input to motor control unit 47, so that the actual signal applied to control unit 47 is the algebraic summation of the signal across points 48 and 49 and the output signal from generator 50.

Generator 50 is mechanically coupled with motor 46 to produce output signals varying in magnitude and polarity with the direction and rate of motor motion, and it is degeneratively electrically connected with respect to the signals across points 48 and 49; in other words, the output of generator 50 is connected in series opposition to the signal applied from points 48 and 49. Assuming that substantially steady-state signals appear across points 48 and 49, motor 46 is thereupon caused to move at a rate and in a direction dependent upon the magnitude and polarity of these signals. Motion of motor 46 not only rotates generator 50 so that it produces a signal but also displaces wiper arm 44 so that source 41 produces a signal. The resulting sequence of operation, therefore, is that motor 46 begins to move at a rate proportional to the signal across points 48 and 49, and then slows down as the outputs from generator 50 and signal source 41 oppose the actuating signal. The output from source 41 being connected serially in the servo circuit reduces the signal across points 48 and 49 while the output of generator 50 being applied in the energization circuit for control unit 47 causes only a portion of the aforesaid reduced signal to be supplied to control unit 47. When motor 46 moves arm 44 to a position where the signal output from source 41 is equal and opposite to the signal from source 32 the signal across points 48 and 49, of course, moves to zero and motor 46 stops rotating. Essentially complete cancellation of steady-state signals from the follow-up source 32 is thus obtained after a time interval dependent upon the original amplitude of the input signal and upon the output characteristics of source 41 and generator 50.

However, when the signals from source 32 are varying rather rapidly, i. e. are transient signals, cancellation is negligible or very slight because of the generator output characteristics and because of the inability of the motor and associated equipment to respond to rapidly varying control signals. Consequently, transient signals from source 32 are impressed on the input of amplifier 19 much as if the follow-up canceller 41 were not in the system.

The canceller source 41 is included in the system to nullify the tendency of source 32 to return the ailerons to their neutral positions at times when the ailerons need to be continuously displaced in order to keep the aircraft in level flight. At such times source 32 produces a substantially steady-state signal which is thereupon cancelled by source 41. Such a system of trim signal cancellation is described and claimed in the foregoing application of Charles M. Young, Serial No. 39,347.

The servomotor 18 as controlled by sources 26 and 20 is responsive both to a displacement of the aircraft about the longitudinal or bank axis and also to a movement about the vertical or turn axis. In other words, either a turning of the aircraft from the desired azimuth or a rolling of the aircraft about the bank axis results in a signal being applied to the servomotor through amplifier 19. In order for the automatic pilot system to control the ailerons by means of servomotor 18, a switch 51 must be closed to energize the coil 52 of a solenoid. The energization of coil 52 results in an axial movement of a solenoid armature 53 against the force applied by a biasing spring 54 and causes an axially movable tooth clutch member 55 driven by motor 18 through gears 36, 37, 38, and 56 to mesh with a similar axially fixed tooth clutch member 57. However, unless coil 52 is energized to overcome the force of biasing spring 54, the spring 54 keeps the clutch members disengaged.

Clutch member 57 is mounted on a shaft 58 which is connected by means of a link 59 to a motion translating system to which is also connected "joy" stick 17, link 59 being joined to one end of a bar 60 to which "joy" stick 17 is attached at a point intermediate its ends. Link 59 is attached to bar 60 by a rotatable pin 61 so that rotation of shaft 58 causes a lengthwise movement of bar 60. However, link 59 is forked at its end adjacent the shaft 58 and is attached thereto by means of a rotatable pin 62 so that angular movement of stick 17 transverse to the aforesaid lengthwise or axial motion of bar 60 does not affect shaft 58. Thus, as is conventionally done in aircraft, ailerons 16 may be controlled by motion of "joy" stick 17 in one direction i. e. in the lengthwise direction of bar 60, while the elevators (not shown) of the aircraft may be controlled by motion of the stick in a direction transverse to the aforesaid direction.

At its end remote from link 59, bar 60 is provided with a downwardly extending portion 63 having formed thereon in alignment with the pin 62 a bearing 64 through which extends a shaft 65. Shaft 65 may rotate within bearing 64, but a pair of stops 66 and 67 mounted on shaft 65 prevent axial movement of the shaft relative to the bar. In other words, any lengthwise or aileron control movement of bar 60 moves shaft 65, while any transverse or elevator control movement of stick 17 does not move shaft 65.

Also secured to shaft 65 is a projection 68 to which are secured oppositely tensioned springs 69 and 70. Springs 69 and 70 tend to oppose motion of shaft 65 and bar 60 in either lengthwise direction and thus normally to center the ailerons in a neutral or null position.

At its end remote from bearing 64 shaft 65 is provided with a screw threads 71, and screwed onto this end is a sleeve 72. A spur gear 73 is mounted on sleeve 72 and meshes with another spur gear 74 which is driven by a servomotor 75. The servomotor 75 itself is mounted on a block 76 which is affixed to another shaft 77 that extends into the end of sleeve 72 not engaged by shaft 65. Shaft 77 is so attached to sleeve 72 that the shaft cannot move axially or lengthwise with respect to the sleeve, although the two members can rotate with respect to each other. Thus manual or automatic pilot aileron actuation by axial movement of the bar 60, shaft 65, sleeve 72 and shaft 77 merely shifts the motor 75 and its mounting axially, but does not cause rotation of the motor.

Upon rotation of motor 75 the resulting rotation of gear 73 causes sleeve 72 to turn on threads 71 so that shafts 65 and 77 are drawn closer together or are forced farther apart. In other words, shaft 65, sleeve 72, and shaft 77 form a mechanical linkage which is expansible and contractible in response to the rotation of motor 75. The remote end of shaft 77 extends into a mechanical power multiplier 78 and springs 69 and 70 are of such strength relative to the mechanical resistance of multiplier 78 that the turning of sleeve 72 does not cause shaft 65 to move but rather results in a movement of shaft 77 further into or out of the multiplier 78, the direction of movement, of course, depending upon the direction of rotation of the motor 75. The power multipler 78 may be any of those devices well known to the art which in response to a small mechanical force produce a much greater mechanical force, and is here shown as having a movable output shaft 79. The output shaft 79 has a forked member 80 mounted on its end and a link 81 is attached to member 80 by a rotatable pin 82. At its other end link 81 is firmly secured to a rotatable shaft 83 which controls the position of ailerons 16. Thus, movement of shaft 79 in response to a movement of shaft 77 causes a movement of ailerons 16.

The primary control or movement of shaft 77 is obtained by the movement of the entire linkage in response to a movement of bar 60 by either "joy" stick 17 or by link 59. Although the forces supplied to the linkage from springs 69 and 70 are sufficient to prevent movement of shaft 65 by sleeve 72, they are not large enough to impede the movement of shaft 65 and thus of shaft 77 by stick 17 or by link 59. However, in addition to this primary control of shaft 77, a slight movement thereof also occurs in response to the turning of sleeve 72 by servomotor 75, as explained above; and it is by applying suitable signals to motor 75 through a control system such as that shown in block form at Fig. 1 that oscillation damping is accomplished in the aileron control system, i. e., increased stability is obtained around the bank or roll axis.

The servomotor 75 is energized from a servo amplifier 84 which is supplied from a signal circuit similar to that of Fig. 1. In the signal circuit there are connected in series circuit relation various signal sources comprising potentiometers connected across voltage sources. One of the signal source 85 produces a rate-of-bank responsive signal and comprises a potentiometer 86 connected across a voltage source 87. The potentiometer 86 has a wiper arm 88 movable in either direction from a fixed tap 89 and the output signal of the source is taken between arm 88 and tap 89, the output signal thus being dependent in polarity and magnitude upon the direction and magnitude of the displacement of arm 88 from tap 89. In order that the source be rate-of-bank responsive, wiper arm 88 is driven by a device responsive to the rate of movement of the aircraft about the bank axis, such a device being indicated schematically as the spring loaded bank-rate gyro 90.

A second of the signal sources is a follow-up or repeat-back signal source 91 which includes a potentiometer 92 connected across a voltage source 93. The potentiometer wiper arm 94 is mechanically actuated from the servomotor 75 through gears 74 and 95 so that its movements correspond to those of motor 75, gear 95 being rotatably mounted in bearings 95a and 95b supported from sleeve 72. The follow-up signal output appearing between wiper arm 94 and a fixed tap 96 is variable in magnitude and polarity dependent upon the extent and direction of movement of wiper arm 94 from coincidence with tap 96, and thus upon the movement of servo 75 from a predetermined normal position. It should be here noted that since manual or automatic pilot movement of the bar 60 and aileron linkage does not rotate motor 75, no follow signal is produced by such movement.

Also connected in the series circuit, is a canceller signal source 97 which likewise comprises a potentiometer 98 energized from a voltage source 99. The potentiometer wiper arm 100 is movable in either direction from a fixed tap 101, and the output signal of source 97 is taken between wiper arm 100 and tap 101, the output thus being dependent in polarity and magnitude upon the direction and magnitude of the displacement of arm 100 from tap 101.

The position of arm 100 is determined by the position of a motor 102 which is energized from a motor control unit 103 to rotate in either direction dependent upon the polarity of the signals applied to control unit 103 and at a rate dependent upon the magnitude of the signals applied to unit 103. Control unit 103 is itself controlled by the signals appearing across points 104 and 105 which signals are the algebraic summations of the outputs of sources 85 and 97 or, in other words, are the combined outputs of sources 85 and 97. The impedance of amplifier 84 is so much greater than the impedance of the various signal sources that the signals from source 91 do not appear to any appreciable extent across points 104 and 105.

In order to make control unit 103, and thus canceller source 97, responsive to non-transient signals only, a generator 106 is included in the input circuit to control unit 103 in the manner described above in connection with the generator 50. Generator 106 is connected in series with the input to control unit 103 so that the actual signal applied to control unit 103 at any instant is the algebraic summation of the signal across points 104 and 105 and output signal from generator 106.

Generator 106 is mechanically connected to motor 102 and upon rotation of motor 102 produces signals opposing those appearing across sources 104 and 105. When a steady state signal appears across points 104 and 105, motor 102 begins to move at a rate and in a direction dependent upon the magnitude and the polarity of the signals. This motion causes generator 106 to produce a signal and also displaces wiper arm 100 so that source 97 produces a signal. The output from source 97 reduces the signal across points 104 and 105 while the output of generator 106 allows only a portion of the reduced signal to be applied to control unit 103, both of these factors resulting in a slowing down of motor 102. When motor 102 moves arm 100 to a position where the output of source 97 is equal and opposite to that from source 85, the signal across points 104 and 105 goes to zero and motor 102 stops rotating. Thus essentially complete cancellation of steady-state or substantially steady-state signals from source 85 is obtained after a time interval dependent upon the original amplitude of the input signal and upon the output characteristics of source 97 and generator 106.

However, due to the generator output characteristics and to the inability of the motor and associated equipment to respond to rapidly varying control signals, any transient signals from source 85 are not cancelled, but are impressed upon amplifier 84 just as if the rate-canceller were not in the system. These transient signals from rate-responsive source 85 cause a movement of motor 75 and thus of shaft 77 and ailerons 16 so as to produce oscillation damping about the bank axis. The follow-up source 91, of course, supplies opposing signals in order to prevent hunting of the system.

Rate canceller 97 then has little or no impairing effect on the transient oscillation damping action of the system. However, due to its property of cancelling steady-state signals from rate-responsive source 85, the canceller source 97 prevents the oscillation damping system from opposing maneuvering of the aircraft about the bank axis. In other words, the cancelling of the steady-state signals from source 85, prevents any turn opposing signals being fed to motor 75 during a steady desired movement or turning of the aircraft about the bank axis. Moreover, since the canceller passes transient signals superimposed on a steady-state base, the system produces oscillation damping no matter whether the aircraft is in level flight or is rolling uniformly about the bank axis.

This oscillation damping system may be used either when ailerons 16 are controlled from "joy" stick 17 or when they are controlled from the autopilot servo 18. As previously mentioned, a switch 51 is employed to place the ailerons under autopilot control and to remove them therefrom. Thus if the pilot desires to have the autopilot control ailerons 16 he need only close switch 51 causing clutch members 55 and 57 to engage, whereas if he desires to manually control the ailerons he need only open switch 51 allowing the clutch members to disengage. The opening of switch 51 closes a switch 107 ganged thereto so as to cage the directional gyro 21. Since the reason that the pilot ordinarily assumes control of the aircraft from the autopilot is to turn the aircraft, it is necessary that the directional gyro be caged during the turn or otherwise it will return the aircraft to the original heading after the turn. In other words, it is necessary to cage the directional gyro 23 during the turn so as to change its azimuth heading as well as that of the aircraft.

To accomplish the caging and course setting function, there is shown in schematic form a known arrangement comprising a caging arm 108, one end of which is pivotally mounted on the vertical gimbal ring 109 of gyro 23. When a knob 110 is pushed inwardly, a cam 111 mounted on shaft 112 causes a link 113, a disk 114, and caging arm 108 to move upwardly whereupon a forked end of the caging arm 108 engages a pin 115 connected to inner gimbal 116 so as to lock the gyro in a well known manner. Inward movement of the knob 110 and the shaft 112 also causes a pinion 117 to engage a ring gear 118 coupled to the outer gimbal 109 so that by rotation of the knob 110 the gyro assembly can be rotated about the vertical axis of gimbal ring 109 to set a desired course.

In order to provide means for automatically caging the directional gyro in response to the closing of switch 107 I have shown schematically a solenoid having a winding 119 arranged to actuate a plunger 120 which may be connected to, or form a part of, the caging mechanism as shown. Thus, when the winding 119 is energized, the solenoid moves the plunger 120 inwardly to effect the caging of the gyro, and when the solenoid is de-energized, a spring 121 moves the caging mechanism in the opposite direction to uncage the directional gyro.

When the ailerons are under autopilot control so that the directional gyro 23 is uncaged, corrective signals are fed to servo amplifier 19 from sources 20 and 26. The signals from source 26 cause movement of aileron 16 so as to keep the aircraft in level flight. The signal from source 20, however, causes movement of the ailerons so as to bank the aircraft whenever it deviates from the desired azimuth heading. The banking of the aircraft through its effect on the associated rudder control channel illustrated in Fig. 3b causes a return of the aircraft to the desired heading.

Figure 3B:
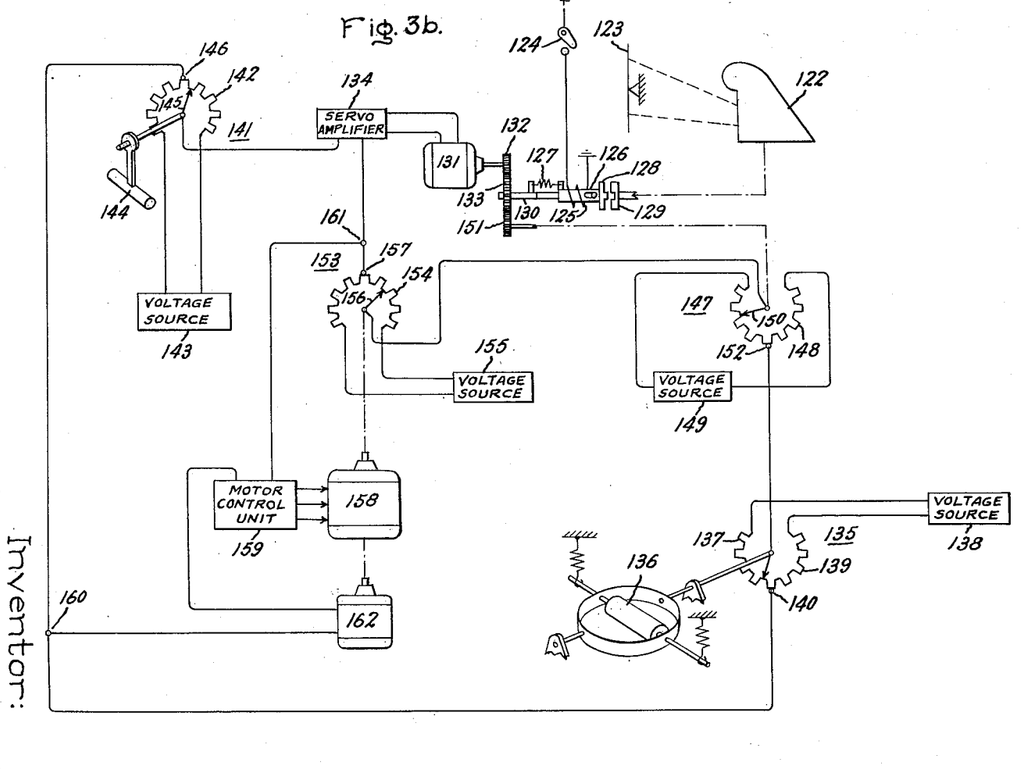
Fig. 3b is a diagrammatic representation of the rudder control channel of an autopilot including the damping arrangement of Fig. 2.

This rudder control channel embodies an oscillation damping and control system similar to that shown in block form at Fig. 2, and is employed to control the movement of a rudder 122. In addition to the autopilot control, manual control means comprising the rudder pedals 123 are also provided, and a switch 124 is provided to energize means for changing the rudder from autopilot to manual control or vice versa. The closing of switch 124 energizes a solenoid coil 125 causing the solenoid armature 126 to move against the bias of a spring 127 and force an axially movable tooth clutch member 128 into engagement with a similar but axially fixed tooth clutch member 129. The solenoid armature 126 and the clutch member 128 are mounted on a rotatable shaft 130 and clutch member 128 is driven thereby. Shaft 130 itself is driven by the rudder channel servomotor 131 through gears 132 and 133 and thus when switch 124 is closed rudder 122 is controlled by servomotor 131, while when switch 124 is open, the rudder is under manual control. Ordinarily, however, manual control is employed only when side-slipping or skidding of the aircraft is desired.

Motor 131, which thus controls rudder 122 whenever the aircraft is in normal flight, is energiezd by a servo amplifier 134 in response to the signal supplied from a plurality of signal sources which, in the illustrated embodiment, are connected in series circuit relation to each other. The first of these signal sources 135 is controlled by a rate-of-turn responsive device, such as the rate-of-turn, i. e. yaw rate, gyroscope 136, and comprises a potentiometer 137 connected across a voltage source 138. A potentiometer wiper arm 139 is coupled for rotation with the gimbal of gyro 136 and the rate-of-turn output signals of the source are derived between wiper arm 139 and a fixed tap point 140 on the potentiometer. These output signals vary respectively in polarity and magnitude in accordance with the direction of turn and the rate of turn of the aircraft about the vertical or turn axis.

A second signal source 141 comprising a potentiometer 142 connected across a voltage source 143 is controlled by the movement of a gravitational and centrifugal acceleration responsive device, such as the pendulum 144. Pendulum 144 is mounted in the aircraft for pivotal motion about an axis parallel to or coincident with the longitudinal axis of the aircraft and is thereby responsive not only to gravitational acceleration but also to centrifugal acceleration during turning the aircraft. Coupled for movement with pendulum 144 is a potentiometer wiper arm 145 which is movable along potentiometer 142 on either side of a fixed tap 146, the output of source 141 being taken between wiper 145 and tap 146. In normal straight line flight, and in a coordinated turn where the vertical axis of the aircraft coincides with the apparent vertical axis, pendulum 144 remains in its null position with wiper arm 145 contacting tap 146. However, whenever the aircraft is banked while in straight flight or whenever the angle of bank is either too shallow or too steep for the arcuate path the aircraft is following in a turn, pendulum 144 moves off its null position to introduce a corrective signal into the servo circuit. The corrective signal in either case moves the rudder to place the aircraft in a coordinated turn, in the first case bringing the aircraft directly thereto from the straight flight pattern and in the second case changing the radius of the arc the aircraft is following in the turn. Once the aircraft has been put in a coordinated turn, the pendulum then returns to the null position. The magnitude of the corrective signal is dependent upon the amount of movement of the pendulum while the polarity of the signal is dependent upon the direction of movement of the pendulum.

Also connected in the servo circuit is a follow-up or repeat-back signal source 147 which includes a potentiometer 148 connected across a voltage source 149. The potentiometer wiper arm 150 is mechanically actuated by the servo-motor 131 through gears 132, 133, and 151 so that its movements correspond to those of control surface 122; and the follow-up signal output appearing between wiper arm 150 and a fixed tap 152 on potentiometer 147 is variable in magnitude and polarity dependent upon the extent and direction of the movement of wiper arm 150 from coincidence with tap 152. Follow-up source 147 is connected in the servo circuit in opposition to sources 135 and 141, thereby to prevent hunting of rudder 122 in the manner well known in the art.

In addition to signal sources 135, 141, and 147 there is also included in the servo circuit a rate and follow-up canceller signal source 153 which operates to substantially cancel any steady-state, i. e. non-transient, signals from sources 135 and 147. The canceller signal source 153 comprises a potentiometer 154 which is connected across a voltage source 155 and has a wiper arm 156 movable in either direction from a fixed tap 157. The output signal of the source is taken between arm 156 and tap 157 and is thus dependent in polarity and magnitude upon the direction and magnitude of the displacement of arm 156 from tap 157.

The position of arm 156 is determined by the position of a motor 158 which is energized from a motor control unit 159 to rotate in either direction dependent upon the polarity of the signals applied to control unit 159 and at a rate dependent upon the magnitude of the signals applied to unit 159. Control unit 159 is itself actuated by the signals appearing across points 160 and 161, which signals are the algebraic summations of the output of sources 135, 147, and 153. The impedance amplifier 134 is considerably greater than the impedance of the various signal sources and therefore signals from source 141 do not appear to any appreciable extent across points 160 and 161.

Included in the input circuit to control unit 159 is a generator 162. Generator 162 is placed in the circuit in order to make control unit 159 and thus canceller source 153 responsive to non-transient signals only, and is connected in the manner heretofore described in connection with generators 50 and 106 of Fig. 3a. Thus, generator 162 is placed in series with the input to control unit 159 so that the actual signal applied to control unit 159 is the algebraic summation of the signal across points 160 and 161 and the output signal from generator 162. Generator 162 is mechanically coupled with motor 158 and produces output signals varying in magnitude and in polarity with the rate and the direction of motor motion; and it is so connected that these output signals oppose the signals applied from points 160 and 161. In other words, generator 162 is degeneratively electrically connected with respect to the signals across points 160 and 161. As with the generators 50 and 106 associated with similar canceller sources 41 and 97, described hereinbefore, the action of generator 162 prevents cancellation of non-steady-state, i. e. transient, signals appearing across points 161 and 162, but allows essentially complete cancellation of steady-state or substantially steady-state signals appearing across points 161 and 162, after a time interval dependent upon the original amplitude of the input signal and upon the output characteristics of source 153 and generator 162.

Since transient signals are not affected by the canceller the output from source 135, which varies in response to the precession of gyroscope 136, is impressed on amplifier 134 whenever the aircraft tends to go into any yawing oscillations. These signals actuate motor 131 and displace rudder 122 so as to damp out the oscillations. The servo follow-up 147 produces transient voltages in opposition to those from source 135 in order to prevent hunting of the rudder.

When the aircraft is in a turn, however, the signal from source 135 is a relatively steady-state signal and therefore is cancelled by source 153 through the action of motor 158 so that the rate-of-turn responsive device can offer no opposition to any desired turning of the aircraft. The action of canceller 153 thereby removes one of the objectional features of conventional yaw damping systems, namely, their tendency to oppose desired turning of the aircraft. However, as is obviously advantageous, should the aircraft begin any oscillatory yawing during the turn, source 135 will actuate motor 131 transiently to damp out the oscillations.

During steady flight either in a straight line or in a turn the rudder 102 is controlled by the action of pendulum 144 as long as switch 124 is closed, no matter whether the other control surfaces of the aircraft are under manual or autopilot control. Whenever the true vertical axis of the aircraft does not coincide with the apparent vertical axis, pendulum 144 moves off center and sends a signal to motor 131 by means of source 141. Rudder 122 is thereupon moved to correct for the condition so that the two axes again correspond. If in straight line flight the aircraft should deviate from the heading for which the azimuth position maintaining or directional gyro 23 is set, a signal is thereupon introduced into the aileron control channel from source 20 to cause a movement of ailerons 16. This banks the aircraft slightly and results in a movement of rudder 122, as actuated by acceleration responsive source 141, to return the aircraft to the correct heading. Once the correct heading is reached, directional source 20 stops producing a signal so that the ailerons return to their null position and the aircraft is returned to level flight. This automatically brings the acceleration responsive source 141 back to the no signal position, whereupon rudder 122 also returns to its null or streamline position. Thus the aileron and rudder channels cooperate to keep the aircraft on the desired heading.

When it is desired to make a turn, the pilot opens switch 51 so as to place the ailerons under manual control, the opening of switch 51 automatically closing switch 107 to cage directional gyro 23. Then to make the turn, the pilot need only move the ailerons banking the aircraft. Since the aircraft is still flying in a straight line, pendulum 144 swings off center and causes movement of rudder 122 to a new position. The movement of the rudder places the aircraft in the desired turn, and centrifugal acceleration returns the pendulum to its center position.

Once the aircraft is in the turn follow-up source 147 may actually move rudder 122 back to its null position if a continued displacement of the rudder is not necessary to continue the turn. However, if continued displacement of the rudder is necessary so that the signal from follow-up source 147 tends to remain steady for a time, canceller 153 will operate to cancel that signal. This is necessary since otherwise the follow-up signal would cause the aircraft to deviate from the path of the coordinated turn because of a lack of a signal from acceleration responsive source 141 when the aircraft is actually in a coordinated turn. The action of source 147 and canceller 153 is thus to keep the aircraft in a coordinated turn until such a time as the pilot returns the aircraft to level flight by means of ailerons 16. Then if the aircraft continues to turn, pendulum 144 pivots in a reverse direction causing source 141 to produce a signal so that the rudder also moves in a reverse direction to stop the turning motion. Once the aircraft is brought back to straight level flight, the pilot may again place it under complete autopilot control by closing switch 51.

By the use of the illustrated combined yaw damping and turn control system as the rudder control channel of an autopilot a large saving in weight is obtained over conventional yaw damping systems used with autopilots. Since any autopilot requires a rudder control channel, the system of this invention thus replaces an existing portion of the autopilot rather than adding an additional automatic control system to the aircraft as to conventional yaw dampers. Moreover, when the system is included in an autopilot, it may be employed to accomplish yaw damping, no matter whether the ailerons and the elevators are under manual or automatic control, merely by designing the autopilot so that the rudder channel can be placed in operation independently of the aileron and elevator channels.

The elevator channel (not shown) of the autopilot may be any of those systems which operate to prevent movement of the aircraft about the transverse or pitch axis. If desired, stability systems embodying this invention may be included in whatever elevator control channel is used so as to prevent any oscillations of the aircraft about the pitch axis. Moreover, it should be understood that the stability systems of this invention are applicable to autopilots having manually controllable signal means for maneuvering the aircraft, as well as in autopilots such as here illustrated which are designed only to maintain straight level flight of the aircraft.

While the various signal sources included in the servo circuits have been illustrated and described as potentiometer-type sources, they have been so depicted primarily for the sake of clearness in understanding the invention, and it should be realized that selsyn-type inductive instruments are presently preferred and that these may be substituted for the potentiometers. If potentiometers are used, the voltage sources shown may be D. C. or A. C. and in practice a common source would be used if A. C. sources were employed. Also the generating means controlled with the canceller motors may comprise selsyn or potentiometer units and associated equipment for obtaining a voltage proportional to speed rather than conventional generators as shown. The various generator output characteristics with respect to speed may be selected or adjusted to secure the optimum rate of change of the canceller signal for particular requirements, and the various motor control units or the motors themselves may be adapted to prevent excessive or insufficient rate of change of the canceller signals. Moreover, it should be understood that in the combined turn control and oscillation damping system it is not essential that the magnitude of deviation responsive source be connected in the servo circuit exactly as shown. If desired, the signal from the magnitude of deviation responsive source could be fed to the motor independently of the other signals.

Thus, while in accordance with the patent statutes, there has been described what at present is considered to be the preferred embodiment of this invention, it will be obvious to those skilled in the art that numerous alterations and modifications may be made therein without departing from the invention, and it is, therefore, aimed in the appended claims to cover all such equivalent variations as fall within the true spirit and scope of this invention.

What I claim as new and desire to secure by Letters Patent of the United States is:

1. In a control system for a craft having a movable control surface arranged to turn said craft about an axis thereof, means for generating a first signal proportional to the displacement of said surface from a normal position, means for generating a second signal proportional to the rate of turn of said craft about said axis, means responsive to the difference of said signals for moving said surface, and time element means connected to neutralize steady-state values of said second signal.

2. In a control system for a craft having a movable control surface arranged to turn said craft about a first axis thereof, manually operable means for moving said surface, electrically actuated means for moving said surface, means for generating a first signal proportional to the displacement of said surface from a normal position, means for generating a second signal proportional to the rate of turn of said craft about said first axis, means for generating a third signal proportional to the deviation of said craft from a desired angle relative to a second axis thereof, means coupling said signals to actuate said electrically actuated means with said first signal opposing the resultant of second and third signals, and time element means connected to neutralize steady-state values of said first and second signals.

3. In a control system for a craft having a movable control surface arranged to turn said craft about one coordinate axis thereof, servo means including a signal responsive device for moving said control surface, a first signal source for generating a signal proportional to the rate-of-turn of said craft about said axis, a second signal source for generating a signal responsive to the displacement of said signal responsive device from a predetermined null position, means utilizing the signals from said first and second sources to energize said signal responsive device, and time element means connected to nullify non-transient values of the signals from said first signal source.

4. In a control system for a craft having a movable control surface arranged to turn said craft about a first axis thereof, servo means for moving said control surface, a first signal source for generating a signal responsive to the rate-of-movement of said aircraft about said axis, a second signal source for generating a signal responsive to the displacement of said servo means from a predetermined null position, a third signal source for generating a signal responsive to the deviation of said craft from a desired angle relative to a second axis thereof, means connecting said sources to actuate said servo means with said third source connected to have its signal oppose the algebraic summation of the signals from said first and second sources, and time element means connected to neutralize non-transient values of the signals from said first and second sources.

5. In an autopilot for a craft having a movable control surface arranged to turn said craft about a first axis thereof, servo means for moving said control surface, follow-up means for producing a first signal proportional to the displacement of said servo means from a normal position, rate-responsive means for generating a second signal proportional to the rate-of-movement of said craft about said first axis, means for generating a signal proportional to the deviation of said craft from a desired angle relative to a second axis thereof, means coupling said signals to actuate said servo means with said first signal opposing the resultant of said second and third signals, and canceller means connected to nullify non-transient values of said first and second signals.

6. In an autopilot for an aircraft having a rudder arranged to turn said aircraft about the vertical axis thereof, a signal channel including servo means for moving said rudder, a first signal source in said channel for generating a signal proportional to the displacement of said rudder from a normal position, a second signal source in said channel for generating a signal proportional to the rate of turn of said aircraft about said axis, a third signal source in said channel for generating a signal proportional to the departure of the apparent vertical of said aircraft from the true vertical thereof, means connecting said sources to actuate said servo means with said third source connected to have its signal oppose the algebraic summation of the signals from said first and second sources, and time element means connected to neutralize steady-state signals from said first and second sources.

7. In an autopilot for a craft having a movable control surface arranged to turn said craft about an axis thereof, a signal channel for controlling the position of said surface including oscillation damping means comprising servo means for moving said control surface, follow-up means for generating a first signal proportional to the displacement of said servo means from a predetermined normal position, rate responsive means for generating a second signal proportional to the rate of movement of said craft about said axis, means energizing said servo means in accordance with the difference of said first and second signals, and canceller means for nullifying non-transient values of said second signal.

8. In an aircraft having a movable control surface for controlling the movement of said aircraft about an axis thereof and having manual means for moving said control surface including an actuating "joy" stick and a mechanical linkage connecting said stick and said surface, automatic means for damping oscillations of said aircraft about said axis comprising a series servo connected intermediate in said linkage between said stick and said surface, a first signal source for producing a signal proportional to the displacement of said servo from a predetermined normal position, a second signal source for producing a signal proportional to the rate of movement of said aircraft about said axis, and means responsive to the difference of said signals for energizing said servo, and time element means connected to nullify steady-state value of said second signal.

9. In an aircraft having a movable control surface for controlling the movement of said aircraft about an axis thereof and having autopilot means for moving said control surface including an actuating device and a mechanical linkage connecting said device and said surface, automatic means for damping oscillations of said aircraft about said axis comprising a series servo connected intermediate in said linkage between said stick and said surface, a first signal source for producing a signal proportional to the displacement of said servo from a predetermined normal position, a second signal source for producing a signal proportional to the rate of movement of said aircraft about said axis, and means responsive to the difference of said signals for energizing said servo, and time element means connected to nullify steady-state value of said second signal.

10. In an aircraft having a control surface for controlling its movement about a vertical control axis, motor means for moving said surface, a plurality of signal sources connected in series relation to actuate said motor means, means for detecting rate of movement of said aircraft about said control axis connected to control the output of a first of said sources, a means responsive to gravitational acceleration and to centrifugal acceleration during a turn of said aircraft connected to control the output of a second of said sources, means responsive to the displacement of said control surface from a null position connected to control the output of a third of said sources, said third source being connected in said circuit to have its output oppose the algebraic summation of the outputs of said first and second sources, and means responsive to any substantially steady-state summation of the outputs of said first and third sources connected to control a fourth of said voltage sources to cause it to supply a signal in said circuit substantially equal and opposite to said steady-state summation.

11. In an aircraft having a control surface for controlling its movement about a control axis thereof, motor means for moving said control surface, a plurality of signal voltage sources connected in series circuit relation to actuate said motor means, means for detecting the rate of movement of said aircraft about said control axis and connected to control the output of a first of said sources, means responsive to the displacement of said control surface from a null position connected to control the output of a second of said sources, said second source being connected in said circuit in opposing relation to said first source, and means responsive to any substantially steady-state values of the output of said first source connected to control a third of said sources to cause it to supply signals in said circuit substantially equal and opposite to said steady-state values.

12. In a control system for a craft having a movable control surface arranged to turn said craft about one coordinate axis thereof, signal responsive actuating means connected to move said surface, means for generating a first signal proportional to rate of turn of said craft about said axis, means for generating a second signal proportional to displacement of said surface from a null position under the influence of said actuating means, and time element means connected to render substantially steady-state values of said first signal ineffective to control said actuating means.

13. In a control system for a craft having a movable control surface arranged to turn said craft about one coordinate axis thereof, series servo means including a signal responsive device for moving said control surface and means for moving said surface independently of said device, a first signal source for generating a signal proportional to the rate of turn of said craft about said axis, a second signal source for generating a signal responsive to displacement of said signal responsive device from a predetermined null position, means utilizing said signals to energize said signal responsive device, and time element means connected to cancel substantially steady-state values of signals from said first signal source.

References Cited in the file of this patent

UNITED STATES PATENTS

| | | |
|---|---|---|
| 2,234,326 | Tiebel | Mar. 11, 1941 |
| 2,545,343 | Conviser | Mar. 13, 1951 |
| 2,546,555 | Meredith et al. | Mar. 27, 1951 |
| 2,567,922 | Brannin et al. | Sept. 18, 1951 |
| 2,582,305 | Young | Jan. 15, 1952 |
| 2,607,550 | Meredith | Aug. 19, 1952 |
| 2,632,142 | Chenery | Mar. 17, 1953 |